US008826550B2

(12) United States Patent
Gnepf (10) Patent No.: US 8,826,550 B2
(45) Date of Patent: Sep. 9, 2014

(54) GEOGRAPHICALLY NORTH-REFERENCED AZIMUTH DETERMINATION

(71) Applicant: Vectronix AG, Heerbrugg (CH)

(72) Inventor: Silvio Gnepf, Heerbrugg (CH)

(73) Assignee: Vectronix AG, Heerbrugg (CH)

( * ) Notice: Subject to any disclaimer, the term of this patent is extended or adjusted under 35 U.S.C. 154(b) by 92 days.

(21) Appl. No.: 13/646,222

(22) Filed: Oct. 5, 2012

(65) Prior Publication Data

US 2013/0192072 A1 Aug. 1, 2013

(30) Foreign Application Priority Data

Oct. 6, 2011 (EP) .................................... 11184180

(51) Int. Cl.
*G01B 11/26* (2006.01)
*G01C 19/38* (2006.01)

(52) U.S. Cl.
CPC ................ *G01B 11/26* (2013.01); *G01C 19/38* (2013.01)
USPC .................................. 33/228; 33/272; 33/290

(58) Field of Classification Search
CPC ............. G01B 11/26; G01B 2210/283; G01B 11/275; G01B 11/27; G01C 19/38; G01C 25/00; G01C 15/00; G01C 15/004; G01C 15/002; G01C 15/105; G01C 5/00; A61B 2560/0242; A61B 2562/0219; A61B 5/021; A61B 5/00; B25J 19/04; B25J 9/10; B25J 9/1638; B25J 9/1694
USPC ................................ 33/228, 272, 275 G, 290
See application file for complete search history.

(56) References Cited

U.S. PATENT DOCUMENTS

| 4,945,647 | A | 8/1990 | Beneventano et al. |
| 7,200,948 | B2 * | 4/2007 | Lee et al. ........................ 33/356 |
| 7,325,320 | B2 * | 2/2008 | Gnepf et al. ..................... 33/356 |
| 8,099,876 | B1 * | 1/2012 | Truncale et al. ................. 33/324 |

(Continued)

FOREIGN PATENT DOCUMENTS

| CA | 1269874 | 6/1990 |
| DE | 3141405 | 5/1983 |

(Continued)

OTHER PUBLICATIONS

William H. Press, et al., Numerical Recipes, The Art of Scientific Computing, Third Edition, Cambridge University Press 2007, Chapter 15 (p. 773-839).

*Primary Examiner* — Yaritza Guadalupe-McCall
(74) *Attorney, Agent, or Firm* — Muncy, Geissler, Olds & Lowe, P.C.

(57) ABSTRACT

A north-referenceable goniometer for azimuthal orientation determination of a sighting device has a base, a rotary part, a rotation angle encoder for determining a rotational position of the rotary part about an upright axis, a gyroscope fixed on the rotary part and having a measuring device oriented orthogonally to the upright axis for determining a component of the Earth rotation vector, and an evaluation unit for determining the azimuthal angle of the geographical north pole. The goniometer also includes an acceleration sensor, and the evaluation unit is formed such that, using the evaluation unit, the determined component of the Earth rotation vector is corrected by a sink rate of the goniometer, determined with the aid of the acceleration sensor, and a systematic measurement error of the gyroscope is corrected by determining measurement values of the component of the Earth rotation vector in at least three different rotational positions.

15 Claims, 8 Drawing Sheets

(56) References Cited

U.S. PATENT DOCUMENTS

| | | | |
|---|---|---|---|
| 2005/0229411 A1* | 10/2005 | Gnepf et al. | 33/356 |
| 2013/0091719 A1* | 4/2013 | Hohl et al. | 33/534 |
| 2013/0192072 A1* | 8/2013 | Gnepf | 33/228 |

FOREIGN PATENT DOCUMENTS

| | | |
|---|---|---|
| EP | 0250608 | 1/1988 |
| EP | 0790485 | 8/1997 |
| EP | 2239540 | 10/2010 |

* cited by examiner

GEOGRAPHICALLY NORTH-REFERENCED AZIMUTH DETERMINATION

This application claims priority to European Patent Application No. 11184180.5, which was filed in Europe on Oct. 6, 2011, and which are both herein incorporated by reference in their entirety.

BACKGROUND OF THE INVENTION

1. Field of the Invention

The invention relates to a north-referenceable goniometer for azimuthal orientation determination of a sighting device according to the precharacterizing clause of Claim 1, and to a method for azimuthal angle determination relative to the geographical north pole according to the precharacterizing clause of Claim 10.

Accurate referencing of the north direction is necessary in a wide variety of applications. In the area of navigation and orientation, surveying and observation, for example, a north reference which is as exact as possible (within the scope of the desired measurement accuracies) is required. Especially in the field—often under adverse conditions relating to temperature, wind and weather—the north direction should be known as a reference for determining the azimuthal angle, for example for cartographic orientation and location of a target. In what follows, determination of the north direction on the ground, which is not intended for navigation in moving land, air or sea vehicles, will be described. Although the principles described here—particularly relating to the methods used and compensation methods—may in principle also be used for goniometers which are in motion, more highly developed and more complex approaches are required for this, particularly in relation to the mathematical signal evaluation and correspondingly rapid and synchronous signal acquisition.

2. Description of the Background Art

The present invention relates primarily to finding north in goniometers which are supported on a substantially fixed and immobile ground-based surface, so that the described measurements are carried out in fixed relation to the terrestrial coordinate system. These ground-based instruments may however—between use for measurements—nevertheless be mobile in the sense of being portable, i.e. also suitable for changing the site. Requirements resulting therefrom are for example low weight, robustness, battery operation, rapid and simple support and initialization, determination of the north reference in a short time, etc.

For example, the present invention provides north finding in the form of an azimuthally rotatable, north-referenceable subunit for a sighting unit, for instance an observation or measuring instrument, with the aid of which an observation or measurement can be extended or supplemented with reliable and accurate north referencing.

One of the possible applications which may be mentioned for this is a stand or a stand unit, the vertical rotation axis of which (also referred to as the upright axis in surveying) is provided with an angle measurement north-referenceable according to the invention. Various observation instruments can then be mounted on this stand or stand unit, for instance binoculars, monoculars, cameras, distance meters, night vision instruments, moderately sized weapon systems, etc. The north-referenced azimuthal angle measurement according to the invention may, however, as an alternative also be integrated into the sighting device so that only its rotatable base requires ground-based support. Using corresponding data interfaces, information from the sighting device, the azimuthal angle meter according to the invention and other instruments may be combined. For example, the north-referenced azimuthal orientation may be used together with an elevation measurement and a distance measurement in order to determine target coordinates of a sighted object. Furthermore, if the own position is known, for example by means of GPS, the target coordinates may also be determined in a cartographic coordinate system.

Magnetic compass orientations are usually too inaccurate for such purposes, and the known effects of declination and deviation as well as their perturbability by influences of external magnetic and electromagnetic fields usually allow only conditionally accurate north pointings. Furthermore, the accuracy to be expected of a magnetic compass measurement is not predeterminable, and the accuracy of the measurement cannot even be deduced with the aid of the measurement itself. Especially in buildings, steel constructions, tunnels or subterranean devices, and in the proximity of electrical devices, a sufficiently accurate magnetic compass measurement is frequently not possible.

Besides finding magnetic north, it is also known to find north by determining the Earth rotation axis which, by definition, connects the geographical north and south poles. This basic principle has already been known since the discovery of the underlying effect in 1817, particularly since the discovery of the Foucault pendulum by Jean Bernard Leon Foucault in 1851 and the invention of the gyrocompass in 1852, whereupon William Thomson also patented a corresponding compass in 1876. The underlying physical principles are therefore sufficiently known in their basis from textbooks and history books.

The principle has become technically usable more recently above all by further developments in the field of gyroscopic sensors—from the classical gyroscope through the laser-ring and fibre gyroscopes, to the currently known MEMS gyroscopes such as vibration gyroscopes, for example according to the HRG principle (=hemispherical resonant gyroscope) or other known gyroscope technologies. Owing to constant reduction of the overall size and the weight while improving the measurement accuracy and reliability, the use of gyroscopes has also become attractive in portable or mobile instruments. Although the underlying measurement principles are fundamentally very old, constant adaptation has taken place to the components and electronic evaluation and data processing components available in the state of the art, and the characteristics thereof.

For instance, U.S. Pat. No. 4,945,647 discloses a gyrocompass system for ground-based equipment. By means of a high-accuracy inertial sensor, "rapid" and accurate north finding is achieved, which is tolerant to vibrations and settling of the instrument. It contains a ring-laser gyroscope arranged on a rotatable platform, the sensitivity axis of the gyroscope being orthogonal to the rotation axis. A possible oblique setting of the platform is measured in two axes by means of acceleration sensors and correspondingly taken into account in the calculations. The rotatable platform with the gyroscope is contained in a closed housing and is respectively rotated through 90 degrees between the measurements by a motor and indexed there during the measurements.

EP 0 250 608 also describes a method for azimuthal angle determination in which, by means of an acceleration meter, both horizontal orientation of the rotary platform can be carried out and possible sinking during the measurement can be detected and/or numerically compensated for. In order to achieve the required accuracy, the measurement is repeated several times respectively in a position rotated through 180° and is averaged.

EP 2 239 540 describes an instrument comprising a gyroscope for mounting on an accurately levelled goniometer. By means of two gyroscopic measurements in two gyroscope positions rotated through 90 degrees, the instrument can determine the rotation axis of the Earth.

CA 1 269 874 describes a gyrocompass with measurement in three positions respectively offset by 120° with a single gyroscope on a platform which can be moved in a motorized fashion and is levelled on a universal suspension. With the aid of inclination sensors and measurement of the rotational position of the universal suspension with angle meters, the horizontal orientation of the compass is furthermore determined.

Equipment is furthermore known which determines the north direction with a plurality of gyroscopes preferably arranged orthogonally. It is theoretically also possible to determine the north direction with a single non-rotatable gyroscope (more precisely, the east-west direction is determined), but in order to achieve sufficient angular accuracies this also requires high-precision gyroscopes, in particular with very little noise, drift and bias, which are expensive, bulky and heavy and therefore unsuitable especially for economical portable instruments for field use.

It is therefore an object of the present invention to provide an improved north-referenceable azimuthal angle meter, in particular for field use.

It is a further object to achieve sufficient accuracies in this case, i.e. of the order of 1 mil (equivalent to Π/3200 rad), by using economical sensors, especially gyroscopes, of the lower accuracy classes ("tactical grade gyros").

It is in this case also an object to achieve north referencing with the corresponding accuracy in a short time, preferably in a few minutes or less.

It is a further object to provide an azimuthal angle meter which allows simple and reliable support, and which in particular can be supported without exact horizontal orientation.

It is also an object to use the fewest possible components which are as lightweight and small as possible, in order to achieve high mobility and robust construction for field use. Thus, in contrast to the use of a full-scale 6 DOF navigation unit, the intention is to use only a single gyroscope. Electromagnetic motors are also intended to be obviated in order to obtain a small, lightweight, economical and robust, goniometer.

The provision of an error-tolerant, or error-secure, method for azimuthal angle determination relative to the geographical north pole is also an object, particularly with a known or determinable orientation accuracy being achieved, for example in the form of an accuracy expectation value.

It is also an object to provide an azimuthal angle meter comprising online status monitoring, which informs the user of the need to redetermine the north reference in the event of an (intentional or unintentional) movement or displacement.

These objects are achieved by implementing the characterizing features of the independent claims. Features which refine the invention in an alternative or advantageous way may be found in the dependent patent claims.

SUMMARY OF THE INVENTION

The present invention relates to a north-referenceable goniometer for azimuthal orientation determination of a sighting device.

The goniometer is constructed with a base for the ground-based support and with a rotary part, which can be rotated azimuthally relative to the base about an upright axis and is equipped with a rotation angle encoder for determining a rotational position of the rotary part about the upright axis.

A gyroscope, fixed on the rotary part and having a measuring device oriented orthogonally to the upright axis, is used to determine a component of the Earth rotation vector, and an evaluation unit is used to determine the azimuthal angle of the geographical north pole with the aid of an orientation of the component of the Earth rotation vector. This constitutes non-magnetic determination of the north pole direction.

According to the invention, an acceleration sensor is fixed on the rotary part orthogonally to the measuring device of the gyroscope.

According to the invention, the evaluation unit is formed in such a way that, using the evaluation unit, the determined component of the Earth rotation vector is corrected by a sink rate of the goniometer, determined with the aid of the acceleration sensor.

According to the invention, the evaluation unit is furthermore formed in such a way that, using the evaluation unit, a systematic measurement error of the gyroscope is corrected by determining measurement values of the component of the Earth rotation vector in at least three different rotational positions, which lie in at least three predetermined rotational position ranges.

In the goniometer, the evaluation unit may be formed in such a way that, using it, rotation positions within the predetermined rotation position ranges can be occupied with the aid of user guidance by manual rotation of the rotary part, the rotation position ranges being in particular predetermined in such a way that the systematic measurement error of the gyroscope can be determined. In this case, the user guidance is controlled by the evaluation unit.

The goniometer may comprise a mounted sighting device, which can be rotated by hand together with the rotary part of the goniometer, the sighting device being in particular mountable on the rotary part only in a predetermined rotation position.

The rotation position ranges may be distributed at least approximately equidistantly around the upright axis of the goniometer, in particular with an average angular spacing of at least approximately 120 degrees and a range width of +/−10 degrees, especially +/−5 degrees.

The evaluation unit may be formed in such a way that in at least three rotational positions, with the aid of measurement values of the acceleration sensor, it is possible to determine an inclination of the upright axis relative to a vertical, which is taken into account when determining the azimuthal angle of the geographical north pole.

The evaluation unit may be equipped with a display unit, for example a graphical or text display, LEDs, etc. and/or with an input unit, for example a keyboard, a touch screen, switches, buttons, etc. As an alternative, operation of the goniometer (or its evaluation unit) may also be carried out by means of an external operating unit connected by means of data communication and in particular the operation may also be carried out by means of a sighting unit mounted on the goniometer.

The evaluation unit of the goniometer may also be formed in such a way that in the at least three rotational positions, with the aid of measurement values of the acceleration sensor, it is possible to determine an inclination of the upright axis relative to a vertical, which is taken into account when determining the azimuthal angle of the geographical north pole.

The evaluation unit may also be formed in such a way that a geographical latitude of a site of the goniometer can be determined, which is taken into account when determining the azimuthal angle of the geographical north pole. The geographical latitude may for example be determinable by means of a GPS, by means of a user query or by means of sighting a known target object.

The goniometer may furthermore comprise an inclination meter, by means of which the goniometer can be supported with an approximately vertical orientation of the upright axis, in particular with an angular deviation of less than five degrees. The inclination meter may also be used for monitoring the support with respect to displacement of the base by the evaluation unit, which may inform the user of possible invalidation of the north referencing.

The invention also relates to a system for nonmagnetically north-referenced sighting, consisting of a goniometer according to the invention and a stand for ground-based support of the goniometer. The system may also comprise a sighting device, in particular an observation instrument, for example binoculars, a monocular, night vision instrument etc., and the sighting device may especially be equipped with an elevation and distance measuring device.

The measurement for the north direction determination is intended to be carried out in a short time (preferably in a few minutes or even less), but at the same time with corresponding accuracy (for example in the mil range (=circle/6400) of the north referencing. For the north referencing, within certain limits an increased accuracy may also be balanced against a shorter measurement time.

An accuracy determination of the ascertained north direction with the aid of the ascertained measurement values may in this case likewise be carried out by the evaluation unit, and in particular made available to the user.

The invention also relates to a method for azimuthal angle determination relative to the geographical north pole, in particular with a goniometer according to the invention, comprising determination of a rotational position of a rotary part, which can be rotated relative to a ground-based supported, base about an upright axis, with a rotation angle encoder, determination of a component of the Earth rotation vector oriented orthogonally to the upright axis in the rotation position, with a gyroscope fixed on the rotary part, and determination of the azimuthal angle of the geographical north pole with the aid of an orientation of the components of the Earth rotation vector with an evaluation unit.

According to the invention, in this case determination of a sink rate of the rotary part relative to the ground with the aid of an acceleration value oriented orthogonally to the orientation of the component of the Earth rotation vector determined by the gyroscope with an acceleration sensor fixed on the rotary part, is carried out by the evaluation unit. Compensation for the ascertained sink rate with the determined component of the Earth, rotation vector, and sequential, manual, rotation of the rotary part into at least three different, rotational positions, which lie in at least three predetermined rotational position ranges, are also a part of the method. The determination of the component of the Earth rotation vector, determination of the sink rate and compensation for the sink, rate are respectively carried out in the at least three rotational positions.

This makes it possible to determine a systematic measurement error, in particular a measurement value offset, of the gyroscope and an orientation of the Earth rotation vector by combining the components of the Earth rotation vector from the at least three rotational positions by the evaluation unit.

The method may be carried out with manual rotation of the rotary part into a rotational position which lies in a predetermined rotational position range, in particular with user guidance of the rotation by the evaluation unit, especially with the rotational position ranges being predetermined in such a way that they are distributed at least approximately uniformly around the upright axis and, in particular, have a range width of +/−10 degrees, especially +/−5 degrees.

Determination of an expectation value of an accuracy of the determination of azimuthal angle of the geographical north pole by the evaluation unit, in particular with provision of the expectation value as an accuracy estimation value for a user, may likewise be part of the method.

Detection of a movement of the base with the aid of measurement values of an acceleration sensor by the evaluation unit, and output of a warning relating to an invalidity possibly due thereto of the azimuthal angle of the geographical north pole, may also be carried out.

Determination of an inclination of the upright axis relative to a vertical with the aid of an acceleration measurement and incorporation of this inclination into the determination of the azimuthal angle of the geographical north pole by the evaluation unit may likewise be carried out by the evaluation unit.

The evaluation unit may be controlled by means of program code, which is stored on a machine-readable medium, or computer data signal embodied by an electromagnetic wave, for carrying out the method according to the invention, in particular wherein the program code allows guidance of the user for manual rotation of a rotary part into rotational positions within at least three predetermined rotational position ranges, and preferably when the program is executed in an evaluation unit of a north-referenceable goniometer.

The method according to the invention and the apparatus according to the invention will be described in more detail below purely by way of example with the aid of specific exemplary embodiments represented schematically in the drawings, further advantages of the invention being discussed. In detail:

BRIEF DESCRIPTION OF THE DRAWINGS

FIG. 17 shows an exemplary diagram of the north referencing accuracy achievable according to the invention and the sink effect thereby compensated for.

The representations in the figures are merely used for illustration and are not to be regarded as true to scale.

DETAILED DESCRIPTION

Figure 1:
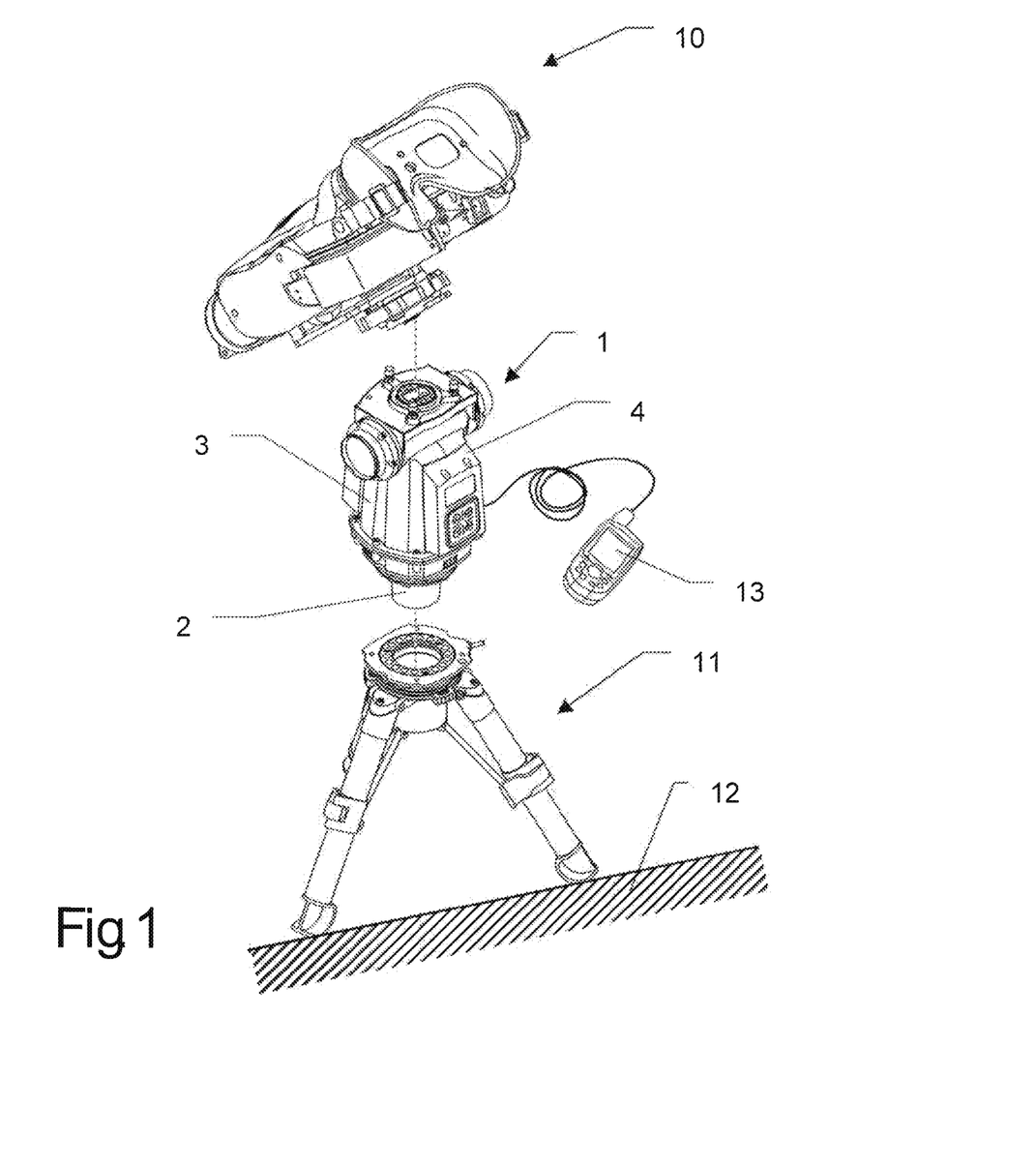
FIG. 1 shows a first exemplary embodiment of a goniometer according to the invention for a sighting device.

FIG. 1 shows an exemplary embodiment of a north-referenceable goniometer 1 according to the invention for azimuthal orientation determination of a sighting device 10, having a base 2 for the ground-based support 11, which is represented in the form of a stand or tripod that is supported on the ground 12. The ground-based support may also be provided by alternative means which ensure a positionally fixed relationship of the base 2 of the goniometer 1 with the terrestrial coordinate system. For example, the base 2 may also (at least temporarily) be fastened in a fixed fashion on a wall or a rock. A stand, similar to the one shown, is an often used embodiment for mobile field use, which can be adapted to the respectively prevailing environmental conditions.

The rotary part 3 of the goniometer 1, which can be rotated azimuthally relative to the base 2 about an upright axis 34, is equipped with a rotation angle encoder for determining a rotational position of the rotary part 3 about the upright axis 34, relative to the base 2. A sighting device 10 can be mounted on the rotary part 2, which can be mounted in a fixed position with the rotary part, i.e. in a predetermined, known and reproducible orientation relative to the upright axis 34. The embodiment shown represents by way of example binoculars with integrated distance measurement functionality, which may additionally be equipped with an inclination measuring device for determining an elevation angle. Other examples of sighting units are for instance monoculars, telescopes, night vision instruments, photographic or video cameras, small weapon systems, distance meters, laser pointers, directional antennas, directional microphones, etc.

The interface, shown in this embodiment, between the sighting unit 10 and the rotary part 3 may, besides the direction determination, also be used for the transmission of electrical signals, for example for display and further processing of data of the goniometer 1 in the sighting unit 10 or data of the sighting unit 10 in the goniometer 1. In order to obtain a transportable system for field use, the components of this exemplary embodiment are constructed so as to be separable, although as an alternative they may also be connected to one another in a fixed fashion, and for example the goniometer 1 may be integrated into the sighting unit 10 or into the supporting device 11.

In the embodiment shown, the rotary part 3 can be rotated through 360 degrees, which permits flexible support and orientation for sighting in arbitrary directions. In embodiments which do not permit free rotation through a full 360 degrees, the sighting range thereby restricted must be taken into account when supporting the goniometer 1.

The goniometer 1 furthermore has an evaluation unit 4 for determining the azimuthal angle of the geographical north pole with the aid of an orientation of the component of the Earth rotation vector.

As an example of a possible expansion option, the embodiment represented shows a GPS unit 13 which permits geographical position determination of the support site of the goniometer 1. Thus, for instance, geographical coordinates of a target observed with the sighting unit 10 may be determined with the aid of the device position which is thereby known, the azimuthal angle determined with the goniometer and an (e.g. opto-electrical) distance measurement. As an alternative, determination of the device position may for instance also be carried out by taking a bearing on known targets with the aid of the north-referenced azimuthal angle. Input of the device position into the system is also possible, for example with the aid of map data, for instance in the form, of longitude and latitude information.

Figure 2:
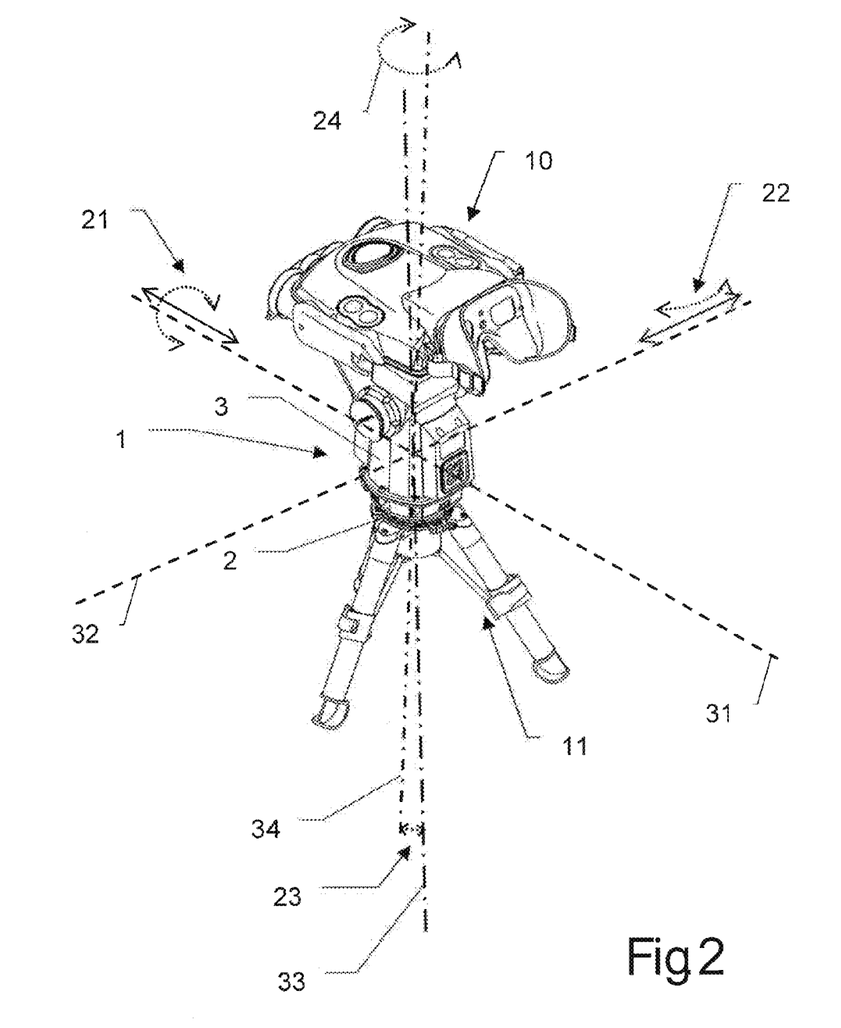
FIG. 2 shows a system of axes in an exemplary embodiment of a sighting system comprising the goniometer according to the invention.

With reference to the exemplary embodiment of FIG. 1, FIG. 2 represents the coordinate system relevant to the north finding explained below. The upright axis 34, about which the goniometer 1 can be rotated (more precisely, the rotary part 3 can be rotated relative to the base 2 about the upright axis 34), is in this case tilted through an angle 23 relative to a perpendicular or vertical axis 33. Although approximate support of the goniometer 1 with the upright axis 34 in the vertical direction 33 (or a rotation plane lying in the horizontal plane) is a usual procedure for supporting a stand 11 or goniometer 1, with the goniometer 1 according to the invention this is not however required with a particularly high accuracy, since precise north referencing is ensured even with an oblique setting of the rotation plane. This is a considerable simplification for field support, since it is often necessary to operate under time pressure, for example in a hazardous area. Furthermore, a potential error source can be excluded by independence from an accurate horizontal orientation for the north finding.

For example, horizontal orientation of the goniometer by eye is sufficient, i.e. for instance in the range of +/−5 degrees. To this end, the goniometer may also comprise a sighting unit for instance in the form of a digital or conventional circular spirit level. The inclination sensors used for digital levelling may, according to the invention, also be used for further functions besides assisting and monitoring an at least coarsely level support. Thus, for example, the inclination measurement, for example by means of a biaxial or triaxial MEMS acceleration sensor, may also be used for monitoring a possible movement, for instance transport or a displacement of the goniometer, which necessitates new north referencing of the goniometer. Informing the user in this regard can contribute to avoiding incorrect measurements.

The rotational position of the rotary part 3, which can be rotated about the upright axis 34, relative to the base 2 can be detected by a rotation angle encoder. The rotation direction is symbolized by the circular arrow 24. It may constitute a relative rotation angle encoder, since referencing is carried out anyway with the aid of the geographical north direction determined according to the invention, although this does not preclude the use of absolute-value rotation angle encoders. The angular resolution of the rotation angle which is determined must in this case be at least equal to or greater than the desired, accuracy of the north referencing, or the azimuthal angle resolution. For example, opto-electrical, magnetic or capacitive rotation angle measuring devices may be used.

As already explained, the goniometer 1 according to the invention has a gyroscope fixed on the rotary part 3 with a measurement direction 31 oriented orthogonally to the upright, axis 34, for determining a component of the Earth rotation vector. The measuring direction 31 is in this case the direction of the rotation vector 21 and perpendicular to the rotation plane, i.e. in the direction of the axis of the rotation, and defines the rotation direction according to the so-called three-finger rule or right-hand rule. The magnitude of the rotation vector 21 defines the angular velocity as the derivative of the rotation angle with respect to time. The rotation vector 21 is represented on the one hand as a linear vector by a solid arrow and on the other hand as the associated rotation sense about the axis 31 in the form of a dotted circle arc.

The acceleration sensor, likewise mounted according to the invention on the rotary part, is oriented with its measurement direction 32 orthogonal to the measurement direction 31 of the gyroscope, the gyroscope and acceleration sensor being connected in a fixed fashion to one another and to the rotary part 3. The acceleration sensor is a high-accuracy acceleration sensor, which is capable of detecting value changes in the range of a few μg ($9.81*10^{-6}$ m/s$^2$). Nevertheless, a restricted measurement range is readily permissible in this case, although it would have to lie in the range of the tolerated deviation from the ideal levelling of the rotation plane of the rotary part. The measured acceleration vector is symbolized by a solid arrow 22, the dotted arrow symbolizing a possible tilt of the base in this direction, which will be discussed in more detail below.

The described arrangements of the axes with respect to one another may readily be subject to certain deviations as a result of production, since these can be determined in the scope of calibration and correspondingly compensated for numerically in the calculations of the north referencing. Nevertheless, care should be taken for a stable arrangement of the sensors described (rotation angle encoder, gyroscope, acceleration sensor).

Figure 3:
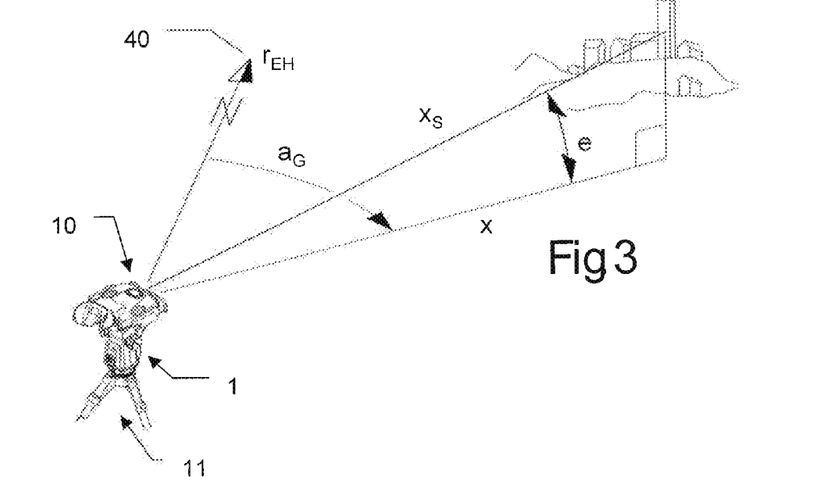
FIG. 3 shows sighting with an embodiment of a system comprising a north-referenceable goniometer according to the invention.

FIG. 3 shows an exemplary field use of the goniometer 1 according to the invention in a system comprising a sighting unit 10 and a stand 11, in which sighting xS is carried out oriented about an azimuthal angle aG and an elevation angle e relative to a direction 40 towards the geographical north pole.

Figure 4:
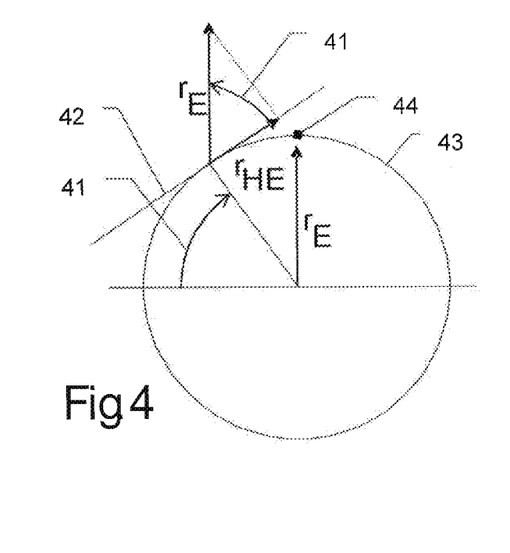
FIG. 4 shows a schematic representation of the Earth rotation vector and its horizontal component.
Figure 5:
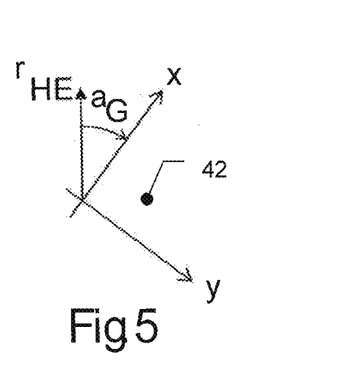
FIG. 5 shows a representation of a coordinate system for north referencing according to the invention.

With a sketch of the terrestrial sphere 43, FIG. 4 explains the determination according to the invention of the geographical north pole 44 with the goniometer 1 according to the invention. The geographical north pole 44 is defined by means of the direction of the Earth rotation vector rE, or a projection rHE of the Earth rotation vector rE into the local horizontal plane 42 at a latitude 41. The azimuthal angle aG represented in FIG. 3 and FIG. 5 of an instrument-based coordinate system, for example of a surveying or observation instrument, is defined as an angle between the direction of the instrument orientation (also referred to as viewing axis, sight axis or line of sight and represented as the x axis in FIG. 3 and FIG. 5) and the local geographical north direction rHE measured in the horizontal plane. The horizontal Earth rotation vector, measured in the instrument coordinate system (x-y), can in this case be described by the formulae $$rHEx = rHE*\cos(aG) \text{ and } rHEy = -rHE*\sin(aG), \quad (1)$$

and the azimuth can be determined from the components rHEx, rHEy by $$aG = \arctan 2(rHEx, -rHEy) \quad (2)$$

where:

$$\arctan 2(r*\cos(a), r*\sin(a)) = a, \text{ for } r>0. \quad (3)$$

In order now to measure the Earth rotation, a suitable sensor is required, especially a high-accuracy rotation rate sensor, for example a fibre-optic gyroscope, a ring-laser gyroscope, a (hemispherical) resonance gyroscope, or the like.

Figures 6, 7:
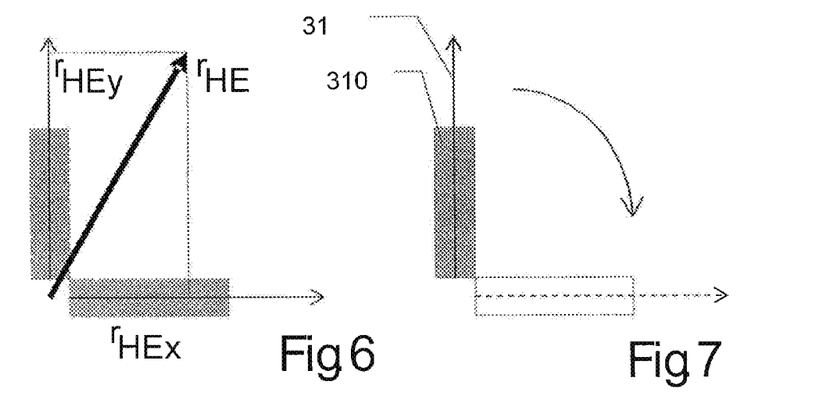
FIG. 6 shows a known Earth rotation measurement with two gyroscopes arranged at an angle of 90 degrees to one another.
FIG. 7 shows a known Earth rotation measurement with a gyroscope rotated through an angle of 90 degrees.

In the simplest case, which is represented in FIG. 6, two such gyroscopes may be used with their sensitivity axes respectively in the x and y directions (or one biaxial gyroscopic sensor), in order to carry out simultaneous measurement of the two components rHEx and rHEy of the horizontal component rHE of the Earth rotation vector rE.

In order to save on costs, overall size and weight—as represented in FIG. 7—it is also possible to use only a single gyroscope 310, which sequentially measures firstly in a first x direction and subsequently in a second y direction, by rotating it through 90° as represented, i.e. for example it is mounted on a platform rotatable through 90° and the measurement direction, or direction of its measurement vector 31, is correspondingly oriented.

In the form according to the invention, the gyroscope 310 is in this case for example mounted on a rotary part, by means of which the sensitivity axis of the gyroscope can be rotated in the horizontal x-y plane, particularly in the x or y direction. This may, for example, involve a freely rotatable platform which by means of an angle measuring device, for example an angle encoder, can determine the relative rotation angle h (for example the described 90 degrees) between a sensor orientation in the x direction of an xS direction relative to the Earth-based instrument coordinate system. As a known exemplary embodiment of such a rotatable structure, this may for instance be compared with the typical geometry of a surveying theodolite, on which a gyroscopic sensor is mounted in a fixed fashion so that its measurement axis is (at least approximately) orthogonal to the upright axis 34 on the horizontally rotatable part, and with which the measurements described above can be carried out.

In this generalized case, the component rx of the Earth rotation vector rHE is given by $$rx(h) = rHE*\cos(aG+h) \quad (4)$$

Or, using the cosine addition formula $$rx(h) = a*\cos(h) + b*\sin(h) \quad (5)$$

with $$a = rHE*\cos(aG)$$

$$b = -rHE*\sin(aG)$$

If the component rx(h) is then measured in two rotation angle positions h1 and h2, the coefficients a and b can be calculated from the resulting 2×2 system of equations, and from this the geographical azimuth of the base vector xS can consequently be determined by $$aG = \arctan 2(a, -b), \quad (6)$$

in a similar way as it is done in the direct measurement with the aid of Equations (1) to (3). In this case, the rotation angle positions h1 and h2 optimally lie as far as possible at 90° to one another, since the greatest sensitivity can thereby be achieved.

Sufficient accuracy of the azimuth determination described above can, however, only be achieved in this case when the gyroscopes, or the single gyroscope, are very accurately calibrated. Gyroscopes are susceptible in particular to an (especially in the long term) unstable bias, i.e. an offset which is not stable in the long term, so that the actual measurement values rx' deviate from the actually prevailing values rx or, put another way, they have an offset o. This offset can be considered as an (at least temporarily) constant measurement signal offset and therefore as a systematic measurement deviation over sufficiently short measurement times, or a systematic error component o which can be regarded as approximately constant during the period of time required for the north determination. Formally, this can be expressed by:

$$rx'=rx+o. \tag{7}$$

In the case of the measurement described above with a single gyroscope in two rotational positions, this offset would give a measurement error which can take values of up to $$\Delta aG = \arcsin(o/HE) \approx o/rHE \; [\text{RAD}]. \tag{8}$$

Since the order of magnitude and stability of the offset o are important features in terms of the quality of a gyroscopic sensor, this also directly affects the sensor cost. Gyroscopes are usually in fact classified in terms of the magnitude and stability of their offset, and subdivided into tactical or navigation gyroscopes, the latter usually being significantly more expensive.

It is therefore desirable to develop a north finding method which allows sufficiently accurate north finding even with tactical gyroscopes having high offset values, as is the case in the present invention. Merely a corresponding time stability of the offset is needed in this case, which constitutes a substantially less stringent requirement, particularly with appropriate compensation for external influences such as temperature changes.

Figures 8, 9:
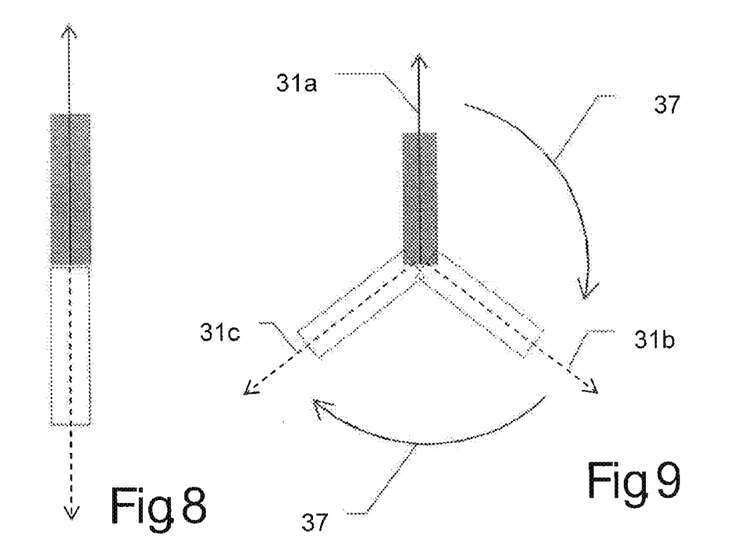
FIG. 8 shows a known offset determination with a gyroscope rotated through 180 degrees.
FIG. 9 shows an embodiment according to the invention of an Earth rotation vector measurement with a single gyroscope in rotational positions distributed uniformly over the full circle.

In order to determine the offset, it is possible to employ a measurement displaced through 180°, as is represented in FIG. 8, although with the aid of such a measurement it is not possible to determine both components rHEx and rHEy.

Figure 10:
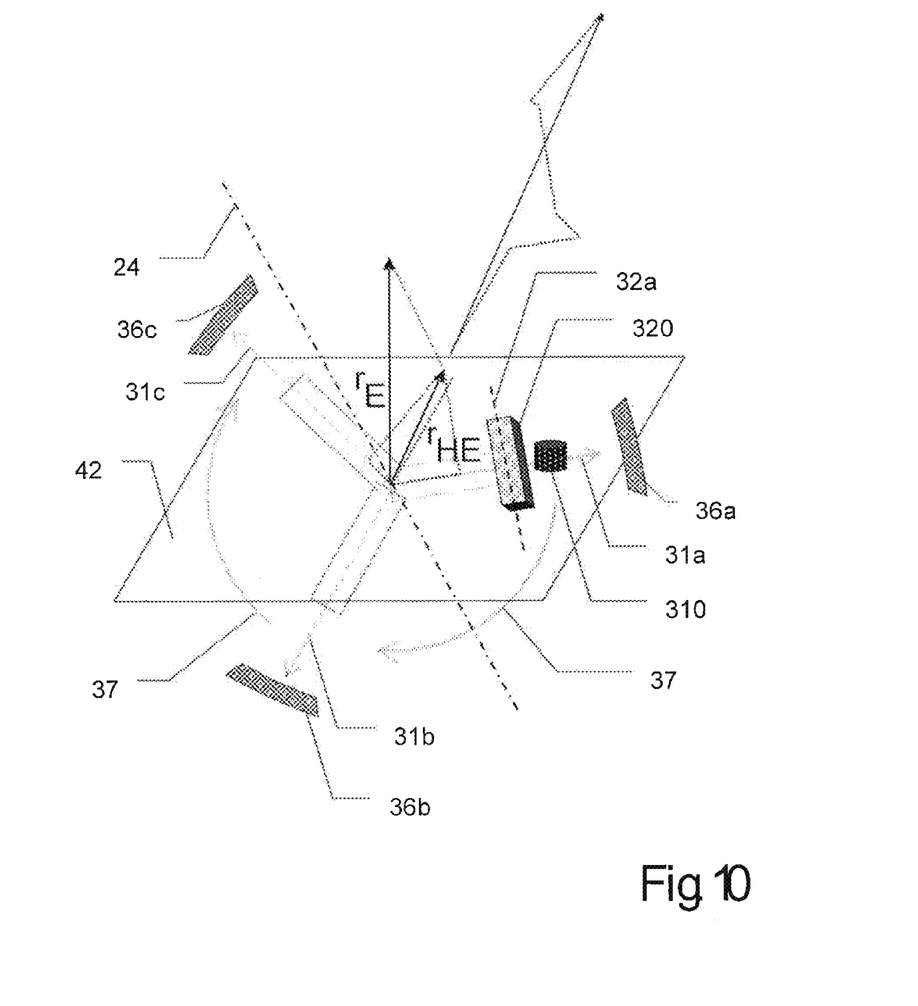
FIG. 10 shows an embodiment of an Earth rotation vector measurement according to the invention in three rotational positions at least approximately offset by 120 degrees.

According to the invention, the procedure as represented in FIG. 9 and FIG. 10 and explained below is therefore adopted. Since three unknown parameters a, b and o are now sought, at least three measurements rx1, rx2, rx3 from different rotational position angles h1, h2, h3 are required. At least approximately uniform, distribution of the measurement positions over the reference circle is advantageous in this case for obtaining optimal contrast of the measurement values (particularly of the offset). Other distributions of the three—with comparatively restricted accuracy—may also lead to the desired, result; high-precision separation is therefore not necessary but the rotational positions must be known with sufficient accuracy relative to one another, although this can be assumed to be satisfied anyway in an angle-measuring goniometer 1. Thus, for example, a uniformly distributed angular separation from h1 to h2 to h3 respectively of (at least approximately) 120° may be used, as is represented by the measurement axes 31a, 31b and 31c of the gyroscope 310. The exact absolute value of the rotational positions, in which the gyroscopic measurements are carried out, is so to speak of secondary importance in this case, since the rotational, angle as a measurement value is in any case taken into account in the calculations, although the rotational position should remain stable during a measurement.

The rotation 37 may be carried out by hand. The requirement for sufficient accuracy of the angle measurement in this regard is readily apparent to the person skilled in the art.

The described three measurements lead to a system of equations, involving three equations and three unknowns, which can be represented as follows.

$$\begin{pmatrix} r_{x1} \\ r_{x2} \\ r_{x3} \end{pmatrix} = M \begin{pmatrix} a \\ b \\ o \end{pmatrix}, \tag{9}$$

$$M = \begin{pmatrix} \cos(h_1) & \sin(h_1) & 1 \\ \cos(h_2) & \sin(h_2) & 1 \\ \cos(h_3) & \sin(h_3) & 1 \end{pmatrix}$$

This system of equations may, for example, be solved by the known mathematical method of matrix inversion (or other principles):

$$\begin{pmatrix} a \\ b \\ o \end{pmatrix} = M^{-1} \begin{pmatrix} r_{x1} \\ r_{x2} \\ r_{x3} \end{pmatrix} \tag{10}$$

As already explained above, the geographical azimuth can be determined therefrom as $$aG = \arctan 2(a,-b). \tag{11}$$

The same set of parameters may also be used for measurements in more than three different rotational positions (or multiple measurements in the same rotational positions). In such cases, special mathematical methods which are particularly suitable for the calculation in this case are known to the person skilled in the art, for example use of the least-squares method, for instance with the aid of the formula:

$$\begin{pmatrix} a \\ b \\ o \end{pmatrix} = (M^T M)^{-1} M^T \begin{pmatrix} r_{x1} \\ \vdots \\ r_{xN} \end{pmatrix}, \tag{10a}$$

$$M = \begin{pmatrix} \cos(h_1) & \sin(h_1) & 1 \\ \vdots & \vdots & \vdots \\ \cos(h_N) & \sin(h_N) & 1 \end{pmatrix}$$

When aggregating a multiplicity of measurements, however, it should, be borne in mind that—owing to the longterm drift of the gyroscope offset—it may be advantageous only to combine measurements within a sufficiently short period of time with constant offset modelling, i.e. to keep the north determination rather short and only to use the minimally required three positions. As an alternative, the user may also application-specifically choose between longer and more accurate and faster but less accurate north determination.

FIG. 10 once more illustrates the described measurement with a single gyroscope 310 in three rotational positions 31a, 31b and 31c in a plane 42 which symbolizes the horizontal plane at the measurement site and is orthogonal to the rotation or upright axis 34. According to the invention, however, this horizontal plane need not coincide very accurately with the rotation plane, as will be explained again in detail below. The component rHE of the Earth rotation vector rE which lies in this plane is determined in the three symbolized, (at least approximately) uniformly distributed rotational positions 31a, 31b and 31c of the gyroscope 310, in this exemplary embodiment lying in particular at 120° from one another, in the form of three components of the Earth rotation vector. The rotational positions 31a, 31b and 31c need not, as already explained, occupy exact angular positions, but should lie in the predetermined rotation angle ranges 36a, 36b and 36c. The occupation of a rotational position within these rotation angle ranges 36a, 36b and 36c by means of manual rotation 37 may be assisted by user guidance by the evaluation unit. For example, it may be indicated to the user by a display that the predetermined rotation angle range, or the rotation 27 necessary therefor, has been achieved. By virtue of the three measurement positions, besides the two x and y components rHEx and rHEy of the component of the Earth rotation vector rHE lying in the plane 42, it is also possible to determine and therefore also compensate for a systematic measurement error of the gyroscope (which is often dominated by a long-term-variable measurement value offset). Accurate north referencing of the azimuthal angle is thereby achieved with the goniometer according to the invention.

Besides the offset of the gyroscope, in practical measurements, especially in the field use of portable instruments—which is indeed a frequent application of the goniometer according to the invention, a further error source is due to an insufficiently stable relationship between the instrument coordinate system and the terrestrial coordinates.

Since the north finding involved here is based on a measurement of the Earth rotation vector (or components thereof), as already explained it is necessary to ensure fixed stationing of the instrument with respect to the terrestrial coordinate system. The gyroscope 310 used is not capable of distinguishing the rotation of the Earth (relative to the stellar reference system) from any other rotational movements, in particular not from rotational movements of the gyroscope relative to the Earth. In particular, any rotational movement of the instrument relative to the Earth is picked up by the gyroscope, for example including the instrument sinking with the gyroscope into the surface on which it is supported.

Figure 11:
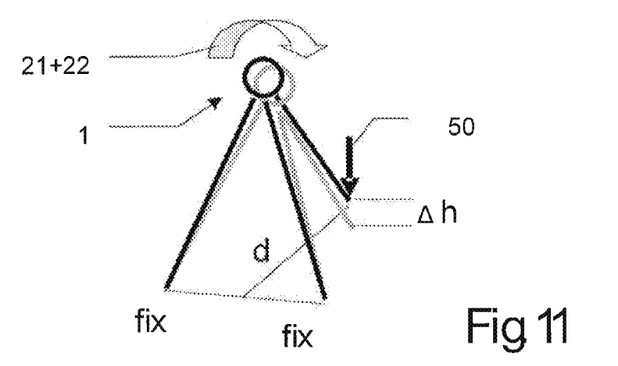
FIG. 11 shows an illustration of the effect of the gyroscope support sinking during the measurement.
Figure 12:
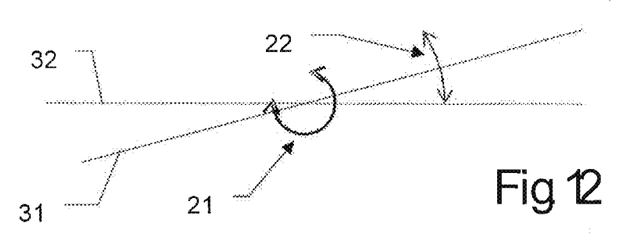
FIG. 12 shows an exemplary system of axes to explain the effect of tilting of the goniometer on the gyroscope measurement.

Sinking 50, as represented in FIG. 11, would constitute a superimposed rotation 21+22 for the gyroscope, and would vitiate the measurement results. Since the rotation rate of the Earth, which is to be measured, is very low (for example about 0.17 degrees per minute with horizontal orientation on the $45^{th}$ parallel), even very minor sinking 50 or shaking during the measurement would vitiate the measurement results.

In practical field use, such support-related perturbations can never fully be avoided and therefore need to be dealt with appropriately. For example sinking 50 of this type does indeed need to be taken into account for an observation instrument, a theodolite or another measuring or sighting unit which, for example, is supported on a stand or tripod on typical surfaces 12 such as earth, grass, sand, gravel, etc. The stand 11 itself may also be a source of such minor movements, for example owing to deformations, for example due to (non-uniform) heating, for instance by exposure to sunlight, slow creep of lubricants in the bearings, etc.

Such effects are perturbing in particular since—as mentioned—the Earth rotation rate rE has very small values of about 360°/24 h=15°/h. The horizontal component rHE measured according to the invention also depends on the geographical position and is given by:

$$rHE=rE*\cos(\lambda),$$

with $\lambda$ as the geographical latitude.

At a medium latitude, the rotation rate to be measured by the gyroscope is therefore about 10°/h.

Figure 13:
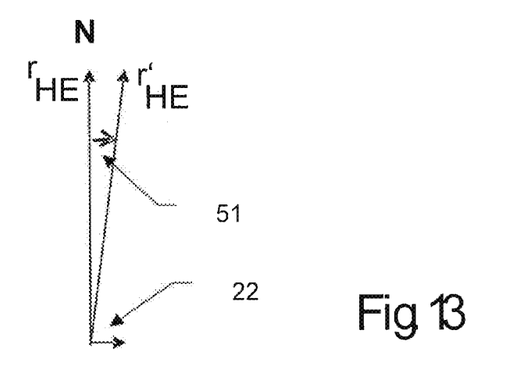
FIG. 13 shows an example of north referencing affected by error due to sinking or tilting during the measurement.

According to Equation (8), a measurement error 22 of 0.01°/h in the gyroscopic measurements would lead to a maximum north pointing error 51 of 0.01°/h/10°/h=$\frac{1}{1000}$=1 milliRAD, as illustrated in FIG. 13.

This is equivalent to an instrument sink rate relative to the Earth of only $$0.01°/h/180*pi*1E6*60=3 \text{ microRAD/minute},$$

or, put another way, a sink rate 50 $\Delta h$ of merely 3 micrometers for a base width d of 1 meter (see FIG. 11). Small movements of this type cannot generally be avoided in practical field use.

Even with the above-described compensation according to the invention for the gyroscope offset with the aid of the measurement in three or more angular positions, the measurement will therefore determine not just the actual Earth rotation rate but a rotation rate affected by error, which may be represented, as $$rGx=rEx+rs, \quad (12)$$

where rs stands for the rotation rate due to the sinking movement relative to the terrestrial coordinates.

A purely gyroscopic measurement is therefore usually not sufficient to ensure reliable north determination in a sufficiently accurately known or guaranteed accuracy interval.

According to one aspect of the invention therefore, in addition to the gyroscope, a measurement of the sink rate and compensation for the rotational movement resulting therefrom in the gyroscopic measurements are carried out. The sink rate is in this case obtained by a correspondingly accurate acceleration measurement perpendicularly to the gyroscopic measurement direction (cf. FIG. 10). To this end, for example, an accurate so-called micro-G sensor 320 may be used, for instance in the form of a sensitive acceleration sensor, the sensitivity axis 32a of which lies in a direction orthogonal to the direction of the measured rotation vector 31a.

The gravitation vector determined in this case may be used on the one hand to determine and mathematically compensate for possibly not fully horizontal support of the instrument, as well as to determine possible sinking as a change in the inclination as a function of time during the measurement.

Figure 14:
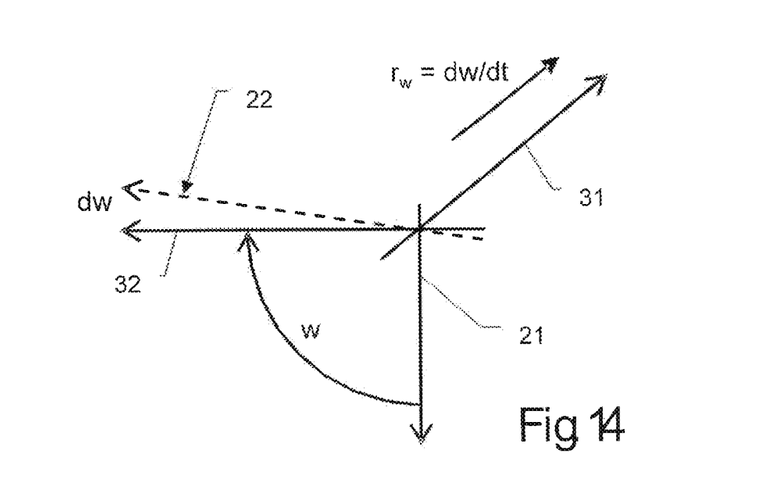
FIG. 14 shows an example of an embodiment of determination, according to the invention, of the sinking by an acceleration sensor.

FIG. 14 graphically represents the sinking and the determination thereof by means of an acceleration sensor. With the aid of the profile of the inclination angle w(t) as a function of time, determined by means of the acceleration sensor during the measurement time of the gyroscope, it is possible for example to determine an average inclination rate rw=rs which can be compensated for during the gyroscope measurement carried out in this direction, in the simplest form, for example by subtracting the inclination rates of the instrument support from the gyroscopic rotation rate, for instance with the aid of the formula:

$$rx'=rx-rw=rEx+rs-rs=rEx. \quad (13)$$

The inclination rate may be determined from a profile of measurement values of the acceleration sensor as a function of time, as is familiar to a person skilled in the art, for example by means of a trend calculation in the form:

$$wj=rw*tj+w0. \quad (14)$$

where $$tj=j*\Delta t, \quad (15)$$

with the measurement intervals, or the measurement rate, of $\Delta t$.

Figure 15:
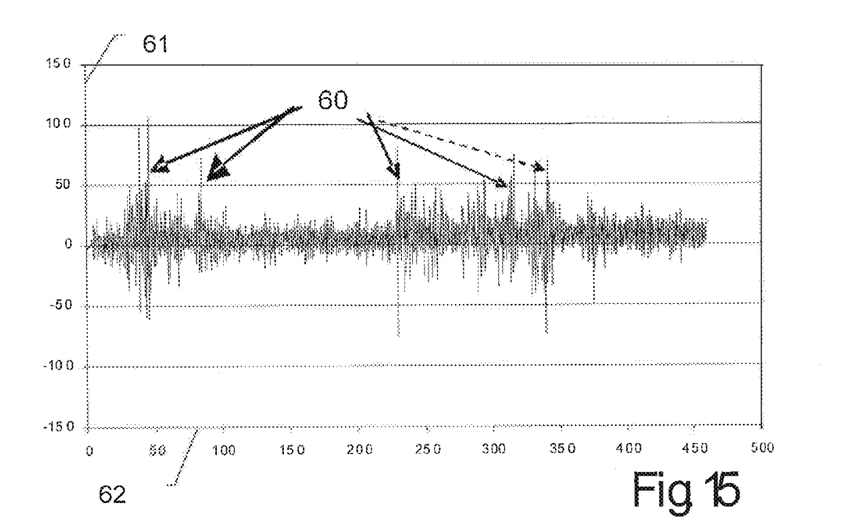
FIG. 15 shows an exemplary measurement signal of an acceleration sensor used according to the invention.

FIG. 15 shows an exemplary profile of a measurement signal of an acceleration sensor 61 as a function of time, scaled in microradians, of the tilt of the support and with the time axis 62 scaled in seconds. Perturbations 60 can be seen clearly, for example caused by individuals or unreliable support. By means of the meter-logical recording thereof according to the invention by means of the acceleration sensor, they can be compensated for appropriately in the rotation rate determination by the gyroscope.

Details of the mathematical methods mentioned here, or alternatives/extensions thereof, as well as the implementation thereof in evaluation units such as digital computer units, microprocessors, DSPs, FPGAs, etc. which, are employed for the mathematical evaluation and/or control of the measurement procedure, may also be referred to in corresponding technical literature relating to the evaluation of experimental data, for example W. H. Press et. al., Numerical Recipes, Third Edition, Cambridge University Press 2007, particularly chapter 15. In the scope of the signal evaluation, it is also possible to employ single or multiple integration of the measurement signals for perturbation suppression. It is furthermore familiar to the person skilled in the art that appropriate analogue and/or digital filtering of the measurement signals, inclusion of quantization effects and suppression of aliasing may also lead to further improvements of the measurement signals and the achievable accuracy. For example, it is thereby possible to block out or reduce perturbations due to environmental vibrations, such as may for instance arise when individuals, vehicles, wind, motors, etc. are in the vicinity.

The values rjx' thereby corrected, particularly with respect to sinking, may be used in Equation (10) or (10a) instead of the uncorrected values rxj.

$$\begin{pmatrix} a \\ b \\ o \end{pmatrix} = M^{-1} \begin{pmatrix} r_{x1} - r_{w1} \\ r_{x2} - r_{w2} \\ r_{x3} - r_{w3} \end{pmatrix} \quad (16)$$

The acceleration sensor may also monitor the positioning of the instrument and, in the event of an instrument movement detected thereby (repositioning, displacement, impact, significant sinking, departure from a levelling range, etc.) the user may be automatically prompted for re-northing.

According to the invention, with the aid of the data determined it is also possible to calculate an expectation value of the accuracy achieved in the north referencing and display this to the user, preferably as an azimuthal angle value. The latter may be determined from the multi-position measurement according to the invention.

According to the invention, however, this horizontal plane need not coincide highly accurately with the rotation plane (which is equivalent to a deviation of the vertical from the upright axis—defining the rotation). It is sufficient to know the inclination of the upright axis relative to the vertical, which is provided by a respective acceleration measurement in the three rotational positions described above. This may be taken into account appropriately in the calculations for the north referencing.

Figure 16:
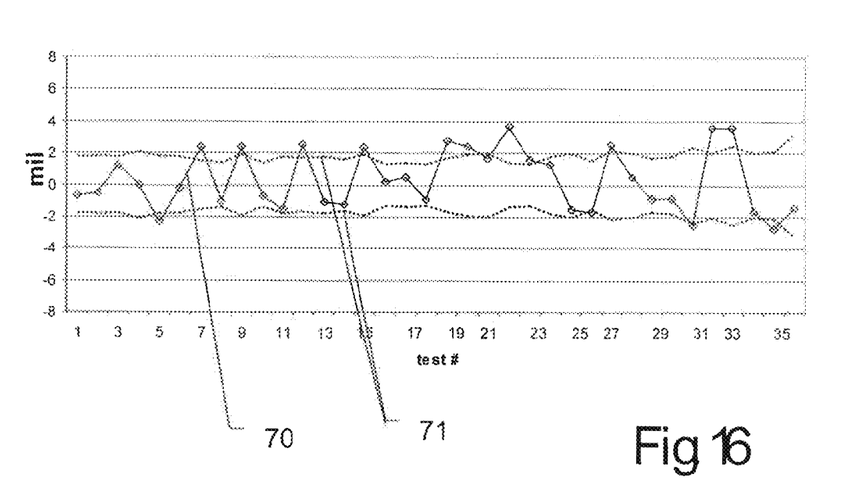
FIG. 16 shows an exemplary diagram of the north referencing accuracy achievable according to the invention.

FIG. 16 shows by way of example a profile of the north referencing accuracy achievable according to the invention with a tactical grade gyroscope and a micro-G sensor in a time of 2 minutes, including possible mechanical errors. The azimuthal error 70 in mil (circle/6400) over a plurality of measurements is shown—as well as an RMS (root mean square) estimation 71 of the error.

Figure 17:
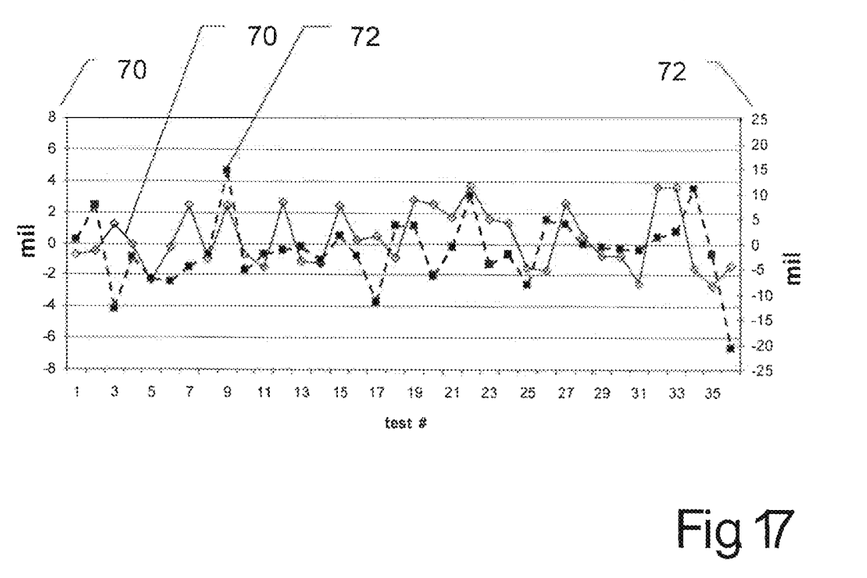

FIG. 17 shows the error of the north referencing 70 in comparison with the respectively performed sinking correction 72 over a plurality of measurements. This expressly demonstrates the practical importance of the sink rate correction according to the invention. Even though by eye there was firm support during the goniometer measurements shown, particularly in the last measurements the error component due to the sinking and thereby compensated for in the north referencing exceeds the north pointing RMS error achievable according to the invention many times.

What is claimed is:

1. A north-referenceable goniometer for azimuthal orientation determination of a sighting device, having
   a base for a ground-based support,
   a rotary part which can be rotated azimuthally relative to the base about an upright axis,
   a rotation angle encoder for determining a rotational position of the rotary part about the upright axis,
   a gyroscope fixed on the rotary part and having a measurement direction oriented orthogonally to the upright axis for determining a horizontal component of the Earth rotation vector, and
   an evaluation unit for determining the azimuthal angle (aG) of the geographical north pole with the aid of an orientation of the horizontal component (rHE) of the Earth rotation vector,
   wherein
   an acceleration sensor having a measurement direction orthogonally to the measurement direction of the gyroscope is fixed on the rotary part and the evaluation unit is formed in such a way that, using the evaluation unit,
   the determined horizontal component (rHE) of the Earth rotation vector is corrected by a sink rate of the goniometer, determined with the aid of the acceleration sensor, and
   a systematic measurement error of the gyroscope is corrected by determining measurement values of the horizontal component (rHE) of the Earth rotation vector in at least three different rotational positions, which lie in at least three predetermined rotational position ranges are determined.

2. The goniometer according to claim 1, wherein the evaluation unit is formed in such a way that, using it, rotational positions within the predetermined rotational position ranges can be occupied with the aid of user guidance by manual rotation of the rotary part, the rotational position ranges being predetermined in such a way that the systematic measurement error of the gyroscope can be determined.

3. The goniometer according to claim 1, wherein a sighting device can be mounted, which can be rotated by hand together with the rotary part of the goniometer, the sighting device being mountable on the rotary part only in a predetermined rotational position.

4. The goniometer according to claim 1, wherein the rotational position ranges are distributed at least approximately equidistantly around the upright axis of the goniometer, with an average angular spacing of at least approximately 120 degrees and a range width of +/−10 degrees, especially +/−5 degrees.

5. The goniometer according to claim 1, wherein the evaluation unit is formed in such a way that in the at least three rotational positions, with the aid of measurement values of the acceleration sensor, it is possible to determine an inclination of the upright axis relative to a vertical, which is taken into account when determining the azimuthal angle of the geographical north pole.

6. The goniometer according to claim 1, wherein the goniometer is integrated into a sighting unit or into a stand, the rotary part being connected in a fixed fashion to the sighting unit or the base being connected in a fixed fashion to the stand.

7. The goniometer according to claim 1, wherein the goniometer is equipped with a data transmission interface, by means of which the evaluation unit combines the azimuthal orientation with external measurement values, the external measurement values coming from a mounted sighting device.

8. The goniometer according to claim 1, comprising an inclination meter for
- support with an approximately vertical orientation of the upright axis, with
- an angular deviation of less than five degrees, and for
- monitoring the support with respect to displacement of the base.

9. A system for nonmagnetically north-referenced sighting, comprising
- a goniometer according to claim 1,
- a sighting unit, an observation instrument, especially having an elevation and range measuring device, and
- a stand for ground-based support of the goniometer.

10. A method for azimuthal angle determination relative to the geographical north pole, with a goniometer according to claim 1, comprising
- determination of a rotational position of a rotary part, which can be rotated relative to a ground-based supported base about an upright axis, with a rotation angle encoder,
- determination of a component of the Earth rotation vector oriented orthogonally to the upright axis in the rotational position, with a gyroscope fixed on the rotary part,
- determination of the azimuthal angle (aG) of the geographical north pole with the aid of an orientation of the components of the Earth rotation vector with an evaluation unit, wherein
- determination of a sink rate of the rotary part relative to the ground with the aid of an acceleration value oriented orthogonally to the orientation of the component of the Earth rotation vector determined by the gyroscope with an acceleration sensor fixed on the rotary part, by the evaluation unit,
- compensation for the ascertained sink rate with the determined component of the Earth rotation vector,
- sequential manual rotation of the rotary part into at least three different rotational positions, which lie in at least three predetermined rotational position ranges, the determination of the component of the Earth rotation vector, determination of the sink rate and compensation for the sink rate respectively being carried out in the at least three rotational positions,
- determination of a systematic measurement error, a measurement value offset, of the gyroscope and an orientation of the Earth rotation vector by combining the components of the Earth rotation vector from the at least three rotational positions by the evaluation unit.

11. The method according to claim 10, wherein manual rotation of the rotary part into a rotational position which lies in a predetermined rotational position range, with user guidance of the rotation by the evaluation unit, especially with the rotational position ranges being predetermined in such a way that they are distributed at least approximately uniformly around the upright axis and have a range width of +/−10 degrees, especially +/−5 degrees.

12. The method according to claim 10,
wherein
determination of an expectation value of an accuracy of the determination of the azimuthal angle (aG) of the geographical north pole by the evaluation unit, with provision of the expectation value as an accuracy estimation value for a user.

13. The method according to any claim 10,
wherein
detection of a movement of the base with the aid of measurement values of an acceleration sensor by the evaluation unit and output of a warning relating to a possible invalidity due thereto of the azimuthal angle of the geographical north pole.

14. The method according to claim 10,
wherein
determination of an inclination of the upright axis relative to a vertical with the aid of an acceleration measurement and incorporation of this inclination into the determination of the azimuthal angle of the geographical north pole by the evaluation unit.

15. A computer program product comprising program code, which is stored on a machine-readable medium, for carrying out the method according to claim 10, wherein the program code allows guidance of the user for manual rotation of a rotary part into rotational positions within at least three predetermined rotational position ranges, preferably when the program is executed in an evaluation unit of a north-referenceable goniometer.

* * * * *